Nov. 13, 1956     J. M. BOURGUET     2,770,503
METHOD AND APPARATUS FOR PNEUMATIC TRANSFER
OF GRANULAR CONTACT MATERIALS

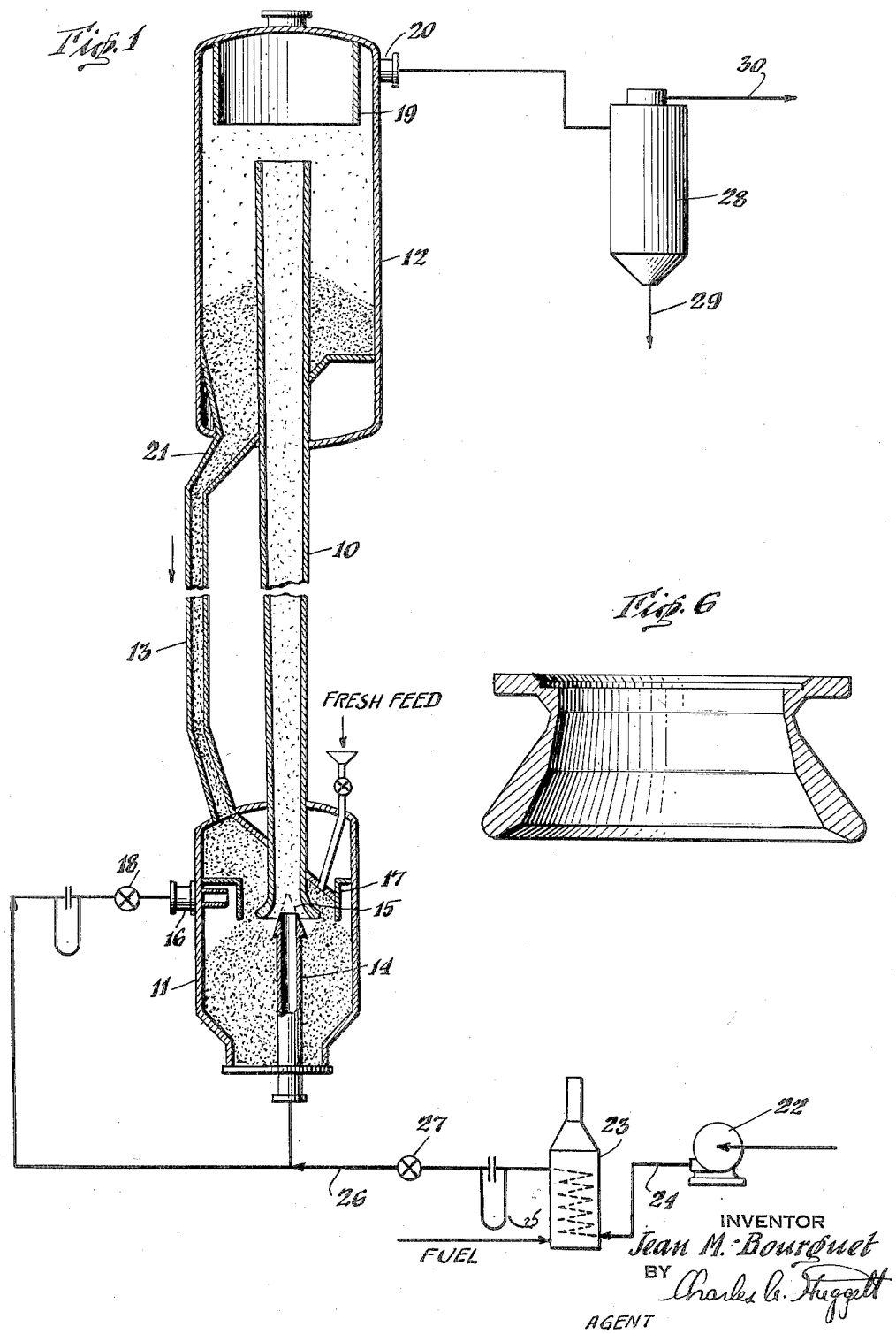

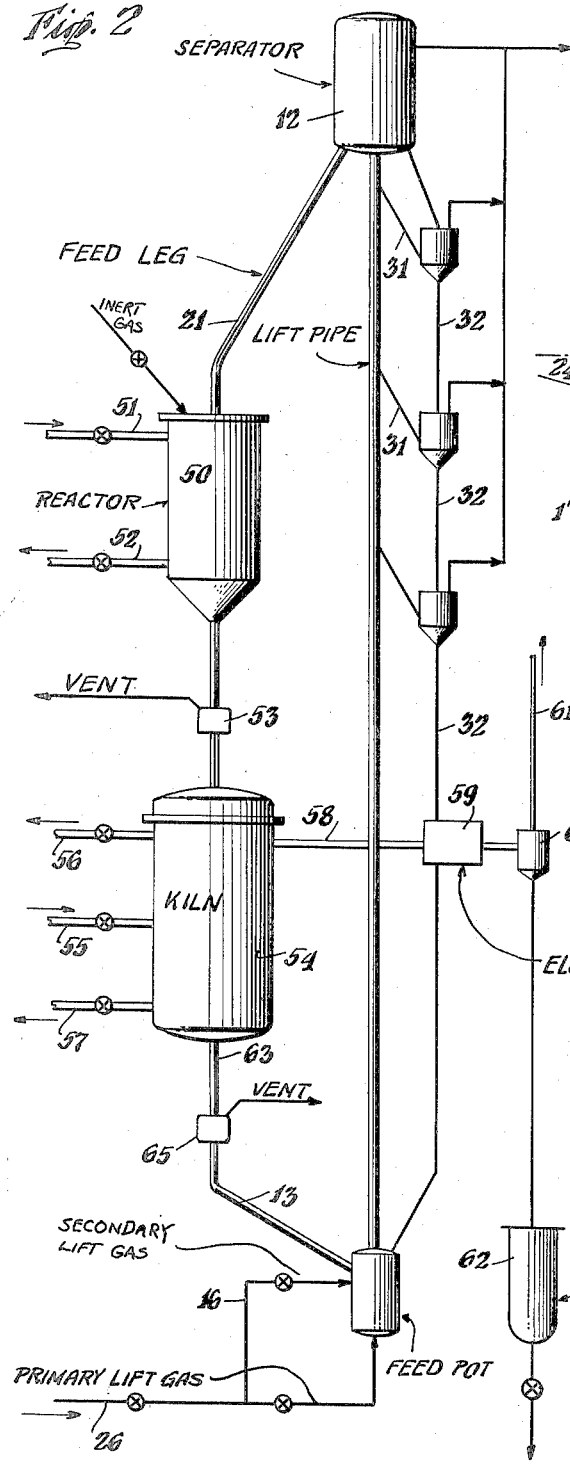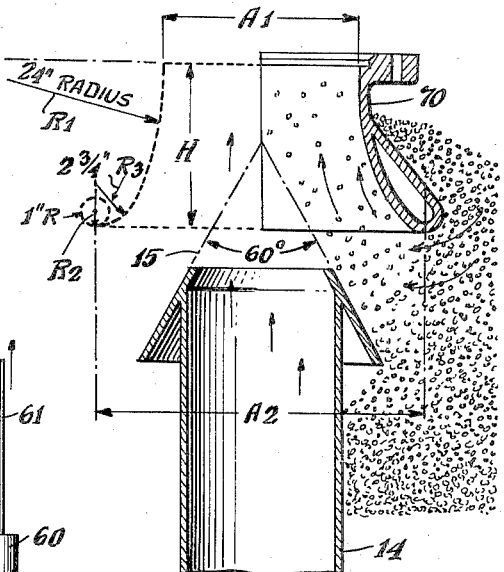

Filed Feb. 16, 1951     3 Sheets-Sheet 3

JEAN M. BOURGUET
INVENTOR.

BY Charles A. Huggett
AGENT

United States Patent Office 2,770,503
Patented Nov. 13, 1956

2,770,503

METHOD AND APPARATUS FOR PNEUMATIC TRANSFER OF GRANULAR CONTACT MATERIALS

Jean M. Bourguet, Westville, N. J., assignor to Socony Mobil Oil Company, Inc., a corporation of New York Application February 16, 1951, Serial No. 211,343

8 Claims. (Cl. 302—17)

This application is directed to a means and method of lifting granular particles in a confined stream of gas and is more particularly directed to the upward conveyance by gas flow of a granular contact material used in hydrocarbon conversion processes.

In the petroleum industry many processes are known in which hydrocarbons, at temperature and pressure suitable for conversion, are contacted with a granular solid material in the form of a gravitating column to produce converted products. In these processes, it is necessary to continuously remove the contact material from the bottom of the column and lift it upwardly to a location above the column to complete, eventually, an enclosed cyclic path. It has been found expedient, in the prior art, to elevate the catalyst by means of bucket-type, continuous, mechanical elevators. For a variety of reasons, such as, for example, higher catalyst circulation rates, it is desirable to replace these elevators, to some extent, by gas lifts.

Examples of various processes in this industry which necessitate the use of granular contact material are polymerization, dehydrogenation, cyclization, desulfurization and catalytic cracking. This invention will be described in relation to a catalytic cracking process, being understood, however, to apply broadly to any process or operation in which it is desired to lift a solid material in particle form with minimum particle attrition and erosion of metal. For example, it may be applied to conversion processes wherein hydrocarbons, prepared for conversion, are brought in contact with inert refractory particles, and converted products are removed therefrom. Typical of such processes is the production of ethylene from various gas oils at temperatures in the neighborhood of 1500° F.

In the moving bed system of catalytic cracking, the particles in granular form are contacted with suitably prepared hydrocarbons while gravitating downwardly through a reaction zone in the form of a substantially compacted column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is laid down on the surface of the catalyst, impairing its ability to function catalytically. The coked or spent catalyst is removed from the bottom of the reaction zone continuously and transferred to the top of a gravitating compact column of particles in a regeneration zone. The catalyst gravitating through the regeneration zone is contacted with a combustion supporting gas, such as air, to burn off the coke deposits from the surface of the catalyst. The coke-free or regenerated catalyst is withdrawn continuously from the bottom of the column in the regeneration zone and transferred to the top of the column in the reaction zone, completing the continuous path. This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. Although the reaction is endothermic whereas the regeneration is exothermic, the two reactions may or may be in substantial balance. It is customary, generally, to supply or withdraw from the system only sufficient heat to maintain a reasonable balance, the flowing catalyst serving as a heat transfer medium. The catalyst is lifted, therefore, at temperatures of approximately 800–1200° F., or thereabouts.

As the catalyst material gravitates through the zones, the gas or vapors contact the catalyst surface by passing through the voids between the particles. It is desirable to maintain the flow of gas through the bed uniform for a variety of reasons. For example, channelling of the gas through the reactor may result in non-uniform coke deposition on the catalyst and non-uniform conversion of the hydrocarbon charge. The cracking efficiency is materially reduced from that which is obtained when the gas flows uniformly through the bed. Channelling in the regenerator causes the particles passing through the channel to overheat and thereby damage the catalytic activity of these particles. Those particles not receiving their share of combustion supporting gas are not sufficiently regenerated to regain their former cracking activity.

In order to provide uniform gas flow and prevent channelling, it is desirable to utilize catalyst particles of generally uniform size and shape, although some irregularity of size of particles is tolerable. For example, they may take the form of pellets, pills, uniform granules and spheres, spheres or beads being preferred. The term "granular" when used in this specification refers broadly to all solid particles of the size range indicated, whether regular or irregular, uniform or non-uniform. The particle size may range from about 3–60 mesh, Tyler Screen Analysis, and preferably 4–12 mesh Tyler. The catalytic material may be natural or treated clays such as bentonite, montmorillonite or kaolin or may take the nature of certain synthetic associations of silica, alumina, silica and alumina, with or without various additions of metallic oxides. The particles may also be formed of inert materials, such as, for example, mullite or corhart. When inedt solids are used as a heat carrier in certain hydrocarbon conversion processes, such as, for example, the conversion of hydrocarbons to ethylene, or for coking etc., the particle size may be greater than 3 mesh Tyler. These materials are well known in the petroleum and related arts, being produced in the form of hard refractory particles having enormous adsorptive surface in relation to their small size.

Channelling may occur in these systems, even though uniform size particles are used, when catalyst attrition rates become excessive. Attrition involves the breaking or spalling of catalyst particles, usually encountered when the particles bang against the metal walls of the enclosed system or bang against themselves, producing much smaller particles called catalyst fines. The fines tend to classify, or gather together, especially when the catalyst is passed through sloping chutes. The concentrated fines gravitate through the column in streams, filling the voids between the larger particles, making the gas flow through these portions of the catalyst columns difficult. Hence, catalyst attrition must be avoided or minimized in these moving bed systems.

It has been found that when catalyst granules rain or are thrown against a metal retaining wall, at least two undesirable results are produced. The catalyst attrition rate, which may be expressed in tons of fines produced per day for a uniform catalyst circulation rate in tons per hour, rises to prohibitive levels. The fines must be removed from the system, posing difficult withdrawal problems. In addition, excessive amounts of fresh catalyst must be added to maintain the catalyst inventory substantially constant. And, also, the metal erodes at the location which is bombarded by the particles because of the abrasive action of the catalyst. The erosion is aided, in part, by the fact that the metal surfaces, for the most part, must be operated at high temperatures. The erosion necessitates frequent shutdown of the system for repair and replacement of the eroded material, and hence must be avoided or minimized.

It has been found that granular catalyst particles can be successfully lifted by gas lifts, comprising essentially a substantially vertical lift pipe, a feed pot located at the bottom of the pipe and a separator located at the top of the pipe. The catalyst is introduced into the feed pot to form a compact mass of catalyst about the bottom of the lift pipe. The major portion of the lift gas is introduced through a primary gas conduit located a short distance below the bottom of the pipe and directed up the pipe. A small amount of secondary gas is introduced into the feed pot, generally, at a level equal to or slightly below the outlet of the primary gas conduit to travel through a portion of the bed in a generally lateral direction before passing up the pipe. The secondary gas may be introduced at other points, particularly at the top of the feed pot, however, the important criterion being that this gas pass through at least a portion of the catalyst mass before passing up the lift pipe. The secondary gas flow rate is controlled, in turn effecting a fine control of the catalyst flow rate by determining the amount of catalyst which is pushed beneath the tube or pipe and lifted by the gas. This feature is shown and claimed in copending case Serial No. 76,017, filed February 12, 1949. The separator, located at the top of the pipe, has baffles incorporated in it to provide for withdrawal of the gas without entrainment of catalyst particles. The vessel is made wide enough to provide a substantial drop in gas velocity in the vessel and the particles drop in the form of a shower on the top of the bed in the lower portion of the vessel about the lift pipe. The separated particles are withdrawn by gravity from the bottom of the vessel into other process vessels, such as, for example, a reaction vessel of a moving bed cracking process.

It has been found that unless precautions are taken in the design of the lower end of the lift pipe, the particles entering the lower end of the pipe converge from all sides of the bed upon a centrally located region in the lower end of the pipe, and above this region the particles are thrown against the wall of the pipe. For example, in a straight walled tubular pipe, the lifted particles collide at a centrally located region in the lower end of the pipe, causing a great deal of catalyst attrition at that location. The particles and fines are then thrown upwardly and outwardly, bouncing off the wall of the pipe several times before assuming streamlined flow. The net effect is high catalyst attrition, excessive erosion of the walls of the pipe, excessive pressure drop across the pipe and inefficient lifting operation.

This invention proposes broadly to provide a means and method of introducing granular particles into the lower end of a vertical gas lift in a streamlined smooth flow.

It is an object of this invention to lift granular solid material by means of flowing gases with minimum attrition of the particles and erosion of the retaining metal.

It is a further object of this invention to provide a method and means of lifting granular contact material, used in hydrocarbon conversion processes, by gas flow with minimum attrition and erosion difficulties.

It is a further object of this invention to minimize attrition at the lower portion of a gas lift through which is being raised by gas flow refractory material in particle size which is subject to fracture by shock blows.

It is a further object of this invention to minimize attrition and erosion at the bottom of a gas lift through which is being raised by gas flow cracking catalyst in the size range of about 3–60 mesh.

It is an important objective of this invention to minimize catalyst attrition and metal erosion at the bottom entrance of a gas lift through which is being raised by gas flow hydrocarbon cracking catalyst in the size range of about 4–15 mesh Tyler.

It is an additional object of this invention to improve the lifting efficiency of a gas lift used to raise granular particles.

These and other objects will be made apparent by the following sketches, all highly diagrammatic in form, and the subsequent discussion of the apparatus and operation of the apparatus shown in the sketches. This is done to illustrate in detail one phase of the broad invention and is not intended to limit the invention to the specific apparatus shown or process described.

Figure 1 shows an elevational view in section of a gas lift adapted to raise granular solids by gas flow.

Figure 2 shows a gas lift incorporated in a moving bed hydrocarbon cracking system.

Figure 3 shows a sectional view of an acceptable shape of bell mouthed entrance for a gas lift pipe adapted to raise granular solids by gas flow.

Figure 6 shows a bell mouthed lift pipe entrance of less preferred shape.

Figure 4:
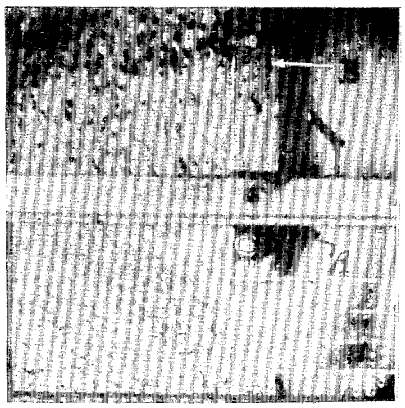
Figure 4 shows catalyst particles entering the lower end of a straight lift pipe.

Referring now to Figure 1, the lift pipe 10 may be a suitably elongated substantially vertical tube, preferably of circular cross-section, although other shapes may be utilized. The feed pot 11 is located at the bottom of the pipe and the separator 12 is located at the top of the pipe with the ends of the pipe projected into each vessel. Gravitating granular material is introduced into the feed pot 11 through the conduit 13, the column of granular material being long enough to provide smooth feeding of the material into the vessel. The granular material forms a compact mass of particles around the lower end of the lift pipe. The vertically directed tube 14 terminates a short distance below the open end of the lift tube, this distance being referred to as the "gap." A screen 15 may be utilized over the open end of the tube 14 to prevent particles from falling into the tube. During operation usually the major portion of the lift gas is introduced through the tube 14, passing directly up the pipe 10. Secondary lift gas is introduced through the conduit 16 at a location behind the baffle 17 and it travels laterally through the bed of granular material. The secondary gas pushes the particles beneath the lift pipe above the tube 14, where it is lifted by the rising gas. By controlling the flow of secondary gas, by means of the valve 18, the amount of granular material lifted is sensitively controlled.

The separator 12 is substantially larger in cross-section than the lift pipe, causing the velocity of the lift gas to decrease after it leaves the lift pipe. The gas makes a reversal around the baffle 19 and is withdrawn through the conduit 20. The granules separate from the gas, falling onto the bed in the separator. The granular material is withdrawn from the separator through the conduit 21 as a compact column for use in any chemical or physical process, not shown, and the granules discharged from the process may be introduced into the conduit 13 to complete an enclosed cycle if desired.

It is important to distinguish, at this point, between transporting fluidized powders and lifting granular particles. Because of the higher mass of the particle, the granules, when gas flow direction changes suddenly do not follow the gas, but tend to continue in a straight direction. Fluidized powders, however, are substantially unaffected by sudden changes in gas flow direction. The powdered material following the gas, remains substantially uniformly distributed throughout the gas. This difference introduces essential and distinguishing problems into the art of lifting granular particles by gas flow.

The lift gas may be any suitable gas, such as, for example, air, flue gas, nitrogen or superheated steam. In Figure 1, heated air is used as the lifting gas being provided by the blower 22 to the line burner or heater 23 through the conduit 24. Detail 25 represents an expansion bend in the line 26 to prevent the development of excessive thermal stresses therein. The flow of heated air through the line 26 may be controlled by the valve 27 to meet the requirements of primary and secondary lift gas. The flow of air is adjusted to provide stable, uniform lifting of the particles and the flow of secondary air is controlled to regulate the amount or flow rate of the solid particles lifted. The air may be at a temperature equal to the temperature of the granular material, if desired, by controlling the amount of heat added in the heater 23. The particle-free air is removed from the separator 12 through the conduit 20 to the cyclone separator 28. A minor portion of particles, entrained in the gas and mainly fines, is removed from the cyclone separator 28 through the conduit 29. The denuded gas is withdrawn through the conduit 30.

Referring now to Figure 2, the gas lift is shown incorporated in a moving bed hydrocarbon cracking system, similar numbers being used to indicate parts similar or equivalent to those shown in Figure 1. The separator 12 is made large enough to serve in a dual capacity, both as a separating means and a surge hopper to allow for irregularities in catalyst flow through the moving bed system. The conduit 21 serves as an elongated feed leg to transfer the catalyst from the hopper 12 into the reaction vessel 50. The reaction vessel may be operated at a pressure which is higher than that of the separator, i. e. 5–30 p. s. i. (gauge), and the catalyst will feed into the vessel through the conduit 21 without valves or restrictions, provided the leg is suitably shaped and sufficiently long. The feed leg must be substantially vertical, thereby requiring a taller gas lift when the pressure differential is increased.

The catalyst is gravitated through the reactor 50 as a compacted column and contacted therein with hydrocarbons, suitably prepared for reaction, introduced through the conduit 51. The reactants may be in liquid, vapor or mixed liquid and vapor form, preheated, generally to about 700–800 F., although higher or lower temperature may, in certain instances, be used, depending, to some extent, upon the type of charging stock. The hydrocarbons are converted in the vessel upon contacting the catalyst to more desirable materials and the products are removed from the vessel through the conduit 52 to fractionation and processing apparatus, now shown. The spent catalyst is withdrawn continuously from the bottom of the vessel and introduced into a depressurizer 53, usually, where the pressure is reduced to a pressure near that existing in the kiln, which is usually substantially atmospheric. If desired the kiln may be operated at or near the reactor pressure in which case the depressuring step may be omitted.

The depressurized catalyst is gravitated downwardly as a compact column through the regenerator or kiln 54 wherein it is contacted with combustion supporting gas and the coke deposits are burned. The catalyst may enter the vessel at a temperature in the neighborhood of 800–900° F. and be removed therefrom at a temperature in the neighborhood of about 1150–1250° F. The temperature in the kiln should be maintained below about 1200° F. and 1400° F. for clay type and synthetic gel type catalysts, respectively. Where only a heat carrying medium is required, however, inert refractory particles, such as corhart or mullite, may be used and restored at temperatures well in excess of the above without damage. In oder to control the temperature of the kiln, cooling coils may be utilized. In some recent designs, catalyst circulation rates are maintained high enough to prevent excessive carbon build-up on the catalyst, allowing the kiln to be constructed with little or no cooling therein. In these systems it is customary to utilize a separate cooler, located elsewhere in the system, for catalyst temperature adjustment. Air is introduced into the kiln 54 through the conduit 55 and travels both upwardly and downwardly through the bed, being withdrawn through the conduits 56, 57. A stream of flue gas is taken from the kiln through the conduit 58 to the elutriator 59 located in the catalyst line 32. Fines are removed with the flue gas to the cyclone separator 60. The flue gas is discharged upwardly through the stack 61 and the fines are dropped into the storage hopper 62.

The catalyst is withdrawn from the bottom of the kiln through the conduit 63. The conduit 63 is connected at its lower end to the top of a depressurizer 65. The catalyst is depressurized, if necessary, in the vessel 65, which also provides an outlet for any lift gas which passes upwardly through the catalyst column in the conduit 13.

In general, the catalyst velocity and gas velocity in the lift for smooth lifting will depend, to some extent, upon the physical dimensions of the lift, the height being a controlling factor. Table I, given below, shows, to some extent, the relationship of catalyst equilibrium velocity with lift height. Broadly, the wide range of the catalyst equilibrium velocity is about 5–300 ft. per sec., whereas a practical range for commercial use is about 5–75 ft. per sec.

TABLE I

| Catalyst Equilibrium Velocity | 5 Ft./Sec. | 18 Ft./Sec. | 50 Fr./Sec. | 110 Ft./Sec. | 280 Ft./Sec. |
|---|---|---|---|---|---|
| Lift Height, Ft. | 5 | 50 | 200 | 500 | 1,000 |

The catalyst equilibrium velocity is the difference between the gas actual linear velocity, at any given location in the lift pipe, and the catalyst terminal velocity. The catalyst terminal velocity depends on the catalyst density, form and shape, and upon the particular lift gas or gases and also the temperature and pressure conditions involved. The catalyst terminal velocity for any given condition can be calculated from equational relationships or estimated from data which are available in the public literature. It may also be determined by routine experimental methods, well known in the art. The values of catalyst equilibrium velocities referred to herein are those values in the lower end of and in the inside region of the lift pipe. For a small lift about 40 ft. tall and 3 inches inside diameter, the catalyst equilibrium velocity may range from about 5–50 ft./sec., whereas for a large lift about 200 ft. tall and 17 inches inside diameter, the catalyst equilibrium velocity may range from about 35–75 ft./sec. In general, the gas velocity will range from about 30–150 ft./sec., being about 30–120 ft./sec. for the small or short lift and 70–150 ft./sec. for the large or long lift, previously described. The catalyst density in the lift pipe may vary over a wide range, depending upon the physical dimensions of the pipe and being adjusted by the control of relative rates of flow of primary and secondary lift gas. In general, the density is controlled in lifts having other feeding arrangements by control of the relative amounts of gas and catalyst entering the lower end of the lift pipe by one means or another. In general, for a large lift pipe, densities up to at least 3 pounds per cubic foot are found satisfactory whereas for the small lift pipe higher catalyst densities, up to about 15 pounds per cubic foot are found satisfactory.

It has been found desirable to recover, as much as possible, the kinetic energy of the catalyst at the top of the lift pipe. It is desirable, therefore, to reduce the catalyst velocity to a minimum when approaching the top, consistent with smooth streamlined flow in the pipe. At least the velocity of the catalyst at the top of the pipe should be reduced to between about 5–35 ft./sec. and preferably to about 5–25 ft./sec. This is accomplished in Figure 1 by using a suitably tapered pipe, which allows the gas velocity to reduce in the upper portion of the lift pipe with a consequent deceleration of the catalyst particles. In Figure 2, portions of the lift gas are withdrawn through the withdrawal conduits to cyclone separators. The separated catalyst particles are returned to the feed pot in a descending stream of catalyst in the conduit 32. The withdrawal of the lift gas in stages acts to smoothly decelerate the catalyst as it approaches to top of the lift pipe.

In this invention, it is shown that catalyst attrition and metal erosion at the bottom of the lift pipe can be materially reduced or eliminated by the proper design and utilization of a bell mouthed inlet, such as shown on Figure 3.

In order to best understand the invention, reference is now made to a typical inlet used by the prior art. Referring to Figure 4, an actual photograph of such a prior art inlet, the particles are seen to converge at the level A near the bottom of the lift pipe. The crowding at level A causes considerable catalyst attrition at that level. Above level A the particles spread out, rebounding from the walls of the pipe at various locations along its length, such as point B. Below point B to the bottom of the lift pipe is seen a void space having substantially an air foil shape in cross-section. This indicates clearly that the catalyst flow is non-uniform in the lower region of such a lift pipe. Non-uniform flow is accompanied by inefficient lifting, requiring the expenditure of excessive amounts of power to lift the desired amount of catalyst, and catalyst attrition, which produces the undesirable fines previously referred to. A cone was attached to the bottom of the lift pipe and tested by catalyst flow. It was found to give undesirable results similar to those indicated above in that the catalyst converged in a region near the lower end of the lift pipe, and at a higher location bombarded the wall of the pipe producing excessive amounts of catalyst fines.

Figure 5:
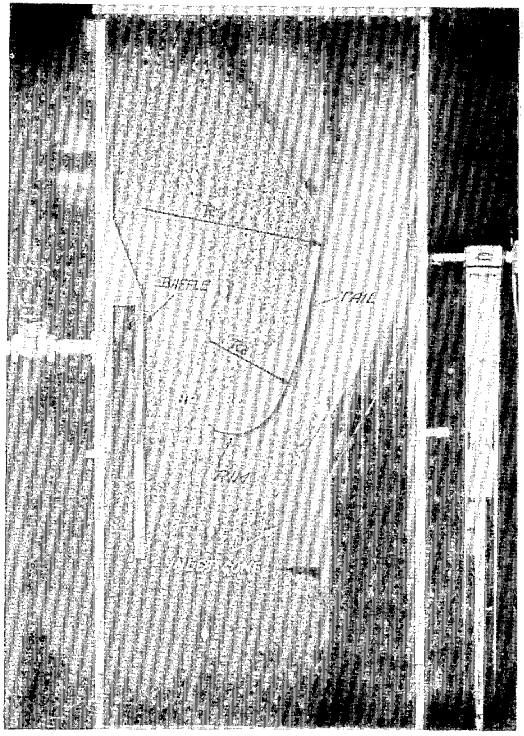
Figure 5 shows catalyst particles entering a bell mouthed inlet having in vertical cross sections a curvature which follows substantially a hyperbolic spiral.

It has been found that if the lower end of the lift pipe tapers outwardly from the vertical lift pipe along a curve which is essentially a hyperbolic spiral having its maximum radius of curvature at the connection with the vertical section of the lift pipe and its minimum radius of curvature outside the lift pipe, at about the point where a tangent to the spiral is vertical again, the operation is good, the lifting efficiency is highest, and the catalyst attrition is lowest. The preferred form of lift pipe entrance is shown in Figure 5, which is an actual photograph of such a lift pipe entrance in operation. It is noticed that the flow of catalyst particles is uniform and smooth, that there are no voids in the lower region of the lift pipe, and further that there is practically no particle collision indicated, resulting in minimum catalyst attrition.

Although the most preferred form of inlet is that having a vertical cross-section which is a hyperbolic spiral, for practical considerations, this may be approximated, with excellent results, as shown on Figure 3, by using three radii to form the curve. The curve of the upper section is formed by $R_1$ which blends near the bottom of the inlet with a curve formed by $R_3$, $R_3$ being considerably smaller than $R_1$. The minimum radius, $R_2$, is used to form the curve from the bottom of the inlet on the outer edge of the rim of the lip of the inlet. When a gradually decreasing radius of curvature is used, $R_2$ is the minimum radius at the point where a tangent to the curve reaches the vertical, indicated $R_2$ on Figure 3. $R_2$ may be about ¾–4 in. broadly and preferably 1½–2½ in., for an equilibrium catalyst velocity in the lower end of the lift pipe of about 5–75 ft./sec. This can be stated in the form of an equation, viz.

$$R_2 = \alpha\sqrt{A^2}$$

where $\alpha$ = constant changing with hardness of the catalyst. For spherical bead catalyst of 4–12 mesh Tyler, $\alpha$ may be 0.4–0.6 whereas for clay pellets, 4–12 mesh, $\alpha$ may be 0.4–1.0.

$\sqrt{A}$ = the velocity of the catalyst particles approaching the bottom of the lift pipe in the annular space between the baffle and the bell, and it varies from 0.5–10 ft./sec.

Ideally, as indicated, the curve of the bell-mouthed entrance is a hyperbolic spiral having a minimum radius of 0.75–4 in. outside the lift where a tangent to the curve is vertical and becoming tangent to the vertical interior wall of the lift pipe at its tail. Although $R_1$ at the tail connection of the bell to the pipe would be preferably infinity, for practical purposes it may be broadly 0.2–10 times the inside diameter of the pipe and preferably 3–6 times the inside diameter of the lift pipe.

Although the above discloses a preferred form of bell-mouthed entrance for the lift pipe, other less preferred forms of the invention have been found to give inferior but still satisfactory operation and substantial improvement over prior art operation. For example, the entrance may be a vertical leg having its lower end tapering outwardly along a curve which is of progressively diminishing radius until it becomes tangent to the horizontal. In this instance the minimum radius, $R_2$, would still be about 0.75–4 in.

In a broad aspect, the invention contemplates that the lower end of the leg taper outwardly in such a manner that the slope of the tapered section gradually decreases from vertical at the pipe straight away to the lower end of the tapered section, the lower end being where a tangent to the tapered section is horizonal. In less preferred form, shown on Figure 6, a plurality of short flat sections joined together so that successive sections starting with the vertical interior wall of the lift form smaller angles with the horizontal, thereby forming an approximation of a hyperbolic spiral at least to the horizontal tangent, is satisfactory. This approximation of a hyperbolic spiral, at least, is found to be a substantial improvement over a simple, conical inlet. Such an inlet is contemplated within the meaning of the broad generic description given above.

The area of the cross-section of the bell-mouthed section may be expressed in terms of $A_1$ and $A_2$, as shown on Figure 3, the areas at the top and bottom of the bell. Expressed as a ratio, $$\frac{A_2}{A_1} = 1.2 - 7$$

broadly, and $$\frac{A_2}{A_1} = 1.5 - 5.0$$

preferably. These cross-sectional areas are uninfluenced by the presence or absence of any air inlet cone, such as is shown attached to the primary air inlet pipe 14, illustrated on Figure 3.

The height, H, of the bell section may be broadly about 0.5–10 percent of the total height of the lift pipe, and preferably 0.8–2 percent of the height. The height for usual operations, i. e. 5–75 ft./sec. catalyst bottom velocity, is broadly 0.8–5 ft. and preferably 1–3 ft. The height, as shown, is related to the lift height because the central bottom equilibrium velocity of the catalyst particles is related to the height of the lift pipe. This inlet design provides the advantages of reduced friction of adjacent particles about the rim of the inlet and less tendency to form a constricted stream in the lower end of the lift pipe. The particles follow streamlined paths into the lift pipe, and particle attrition is materially reduced. In addition, the lifting is more efficient, a smaller pressure drop across the lift being required for the same catalyst flow through the lift. And another advantage is that the metal erosion in the lower end of the lift pipe is materially reduced.

*Example No. 1*

Suitable dimensions for a bell entrance for a 200 ft. lift pipe of 16 in. nominal inside diameter are $H = 1$ ft. 1 in.

$\dfrac{A_2}{A_1} = 2.85$ $R_2 = 1$ in.

$R_1 = 24$ in.

$R_3 = 2.75$ in.

Using air as the lifting gas at 1000° F. and 0.2–2 p. s. i. (gauge), the air velocity at the bottom of the pipe is adjusted to about 90–100 ft. per sec. Using bead catalyst of about 4–12 mesh Tyler, 45 pound per cu. ft. apparent density, the catalyst equilibrium velocity is 40–45 ft. per sec. The catalyst equilibrium velocity is equal to the gas velocity—the terminal velocity. The terminal velocity is a constant dependent upon the physical properties of the catalyst and gases and may be obtained from physical tables. The catalyst approaches and lifts smoothly upward through the pipe under these conditions. The catalyst handled was 50–250 tons/hour, depending upon the density of the catalyst stream, which ranges from 0.5–2.5 pound/cu. ft. A tapered lift pipe was used in this example, having an inside diameter of 15⅜ in. at the base and 20⅛ in. at the top of the leg. The secondary gas stream was 5–25 percent of the total gas stream. The pressure drop between the top and bottom of the lift was: 0.65 p. s. i. for 50 ton/hour rate, 4.6 p. s. i. for 250 ton/hour rate.

Referring to Figure 5 again, the region formed by the radius $R_3$ is termed the rim of the inlet. The upper end of the spiral, formed by the radius $R_1$, is termed the tail. The lip formed where the straight outer edge of the inlet joins the curve may be located where the rim becomes tangent to the horizontal. However, this results in a sharp edge which has been found undesirable because catalyst particles are crushed against this edge. This can be improved by extending the rim. A smaller radius of curvature, $R_2$, may be used for the extended portion of the rim, such as indicated on Figure 6, the lip being located where the rim becomes tangent to the vertical. The outer surface of the bell, from the lip to the tail is shaped in the form of a cone, avoiding sharp edges thereby.

In general, the operating range of the equilibrium catalyst velocity, previously described, will be broadly 5–75 ft./sec. This varies with the height of the lift, and hence, for lifts of 150–225 feet, the preferred range is 25–60 ft./sec. The air velocity at the bottom necessary to obtain these catalysts equilibrium velocities will be broadly 55–150 ft./sec. and preferably 75–110 ft./sec. In general, the catalyst capacity will range 50–250 tons/hr., requiring catalyst densities of about 0.5–2.5 pound/cu. ft.

*Example No. 2*

A test was made using a 42.7 ft. tall lift pipe having an internal diameter of 3 in. and using air as the lift gas. The catalyst attrition, expressed in percent of catalyst flow which must be added to maintain constant average particle size and constant inventory of material, was found to be materially reduced when a bell inlet, as shown on Figure 3, was added.

| Description of Inlet | Catalyst Flow Rate, Tons/hr. | Power Efficiency, Percent | Attrition, Percent Per Cycle |
|---|---|---|---|
| 1. Straight inlet | 16 | 20.1 | .0094 |
| 2. Bell mouthed inlet | 16 | 27.7 | .0034 |

*Example No. 3*

An inlet found satisfactory for a 10 inch inside diameter lift pipe has the following dimensions:

$R_1 = 15$ in.

$R_2 = 1$ in.

$R_3 = 2$ in.

$H = 8$ in.

$\dfrac{A_2}{A_1} = 2.5$

*Example No. 4*

An inlet found satisfactory, for use on a tapered lift pipe, having an internal diameter at the bottom of 25.6 in. and a length of 237 feet, has the following dimensions:

$R_1 = 46$ in.

$R_3 = 3¼$ in.

$R_2 = 1$ in.

$H = 27$ in.

$\dfrac{A_2}{A_1} = 3.35$

Nominal catalyst circulation 360 tons/hour.

The above examples are not intended to limit the invention, being included only for illustrative purposes. The only limitations intended in the scope of the invention are those found in the appended claims.

I claim:

1. A gas lift for conveying upwardly granular material comprising a substantially vertical elongated lift pipe, a separating vessel at the top of the pipe, a feeding vessel at the bottom of the pipe, means for introducing a granular material into the feeding vessel to form a compact column of particles about the bottom of the lift pipe, an upwardly directed pipe terminating in the feeding vessel near the bottom of the lift pipe adapted to introduce primary lifting gas directly into the lift pipe without passing through any substantial thickness of the bed of granular material, means for introducing secondary lifting gas into the feeding vessel at at least one location outside of the lift pipe and laterally offset from its axis and far enough from the lower end of said lift pipe to cause said secondary lifting gas to pass through a substantial thickness of the bed of granular material, the lower end of the lift pipe tapered outward gradually from substantially vertical along a substantially hyperbolic spiral curve to a minimum slope at the bottom of the pipe, means for withdrawing separated lift gas from the separator and conduit means for withdrawing granular material from the bottom of the separating vessel.

2. A gas lift for conveying upwardly granular material comprising a substantially vertical elongated lift pipe, a separating vessel at the top of the pipe, a feeding vessel at the bottom of the pipe, means for introducing granular material into the feeding vessel to form a compact column of particles about the bottom of the lift pipe, an upwardly directed pipe terminating within the feeding vessel near the bottom of the lift pipe adapted to introduce primary lifting gas directly into the lift pipe without passing through any substantial thickness of the granular bed, means for introducing secondary lifting gas into the feeding vessel at least one location outside of the lift pipe and laterally offset from its axis and far enough from the lower end of said lift pipe to cause said secondary lifting gas to travel through a substantial thickness of the granular bed before entering the lift pipe, the lower end of said lift pipe starting at a location above the bottom of the pipe equal to about $H=2-3$ ft. being tapered outward gradually from substantially vertical following a curve whose radius of curvature is a maximum of about 3–6 times the inside diameter of the lift pipe at the top of the tapered section and decreases to a minimum of about 1.5–2.5 in. at the bottom of the pipe, the curved surface extending from the bottom of the pipe upwardly and outwardly at constant radius of curvature to a location above the bottom of the pipe at which a tangent to the curve is vertical, means for withdrawing separated lift gas from the separating vessel and conduit means for withdrawing granular material from the bottom of the separating vessel.

3. The method of lifting granular contact material with minimum attrition which comprises gravitating contact material downwardly onto a substantially compact bed of contact material in a confined zone, maintaining a confined lift passage extending upwardly from an intermediate location in said bed to a separating zone located well above the confined zone, said passage being in communication on its downwardly facing lower end with said bed, supplying a first stream of lift gas into said confined zone so that it may enter the lower end of said lift passage without having passed the gas through any substantial portion of the substantially compact bed, introducing a second stream of lift gas into said bed a spaced distance away from the lower end of said lift passage and flowing it through the intervening portion of said bed into the lower end of said lift passage, thereby inducing contact material from within said bed to flow into said first stream, passing the major portion of the granular contact material downwardly about the outer edge of the passage, directing each particle about the lower edge of the passage and into the passage following a path which is substantially a portion of a hyperbolic spiral curve, the curve having a formula $\rho\theta=a$, where $\rho$ is the vector of the curve expressed in inches, $\theta$ is the angle through which the vector is rotated in radians, and $a$ is a constant expressed in inches, the portion of the curve being selected to gradually change the direction of the granular particles from vertically downward to vertically upward, the radius of curvature increasing gradually from a minimum to a maximum value.

4. The method of lifting granular contact material with minimum attrition which comprises gravitating contact material downwardly onto a substantially compact bed of contact material in a confined zone, maintaining a confined lift passage extending upwardly from an intermediate location in said bed to a separating zone located well above the confined zone, said passage being in communication on its downwardly facing lower end with said bed, supplying a first stream of lift gas into said confined zone so that it may enter the lower end of said lift passage without having passed the gas through any substantial portion of the substantially compact bed, introducing a second stream of lift gas into said bed a spaced distance away from the lower end of said lift passage and flowing it through the intervening portion of said bed into the lower end of said lift passage, thereby inducing contact material from within said bed to flow into said first stream, passing the major portion of the granular contact material downwardly about the outer edge of the passage, directing the material inwardly gradually along a curve whose radius is about 0.75–4 in. from substantially vertically downward to substantially horizontally inward, continuing the particles of material inward and gradually upward following a curve whose radius is increasing incrementally until the particles of material are moving upwardly in a substantially vertical direction, the radius of curvature at that point being about 0.2–10 times the diameter of the horizontal cross-section of the passageway.

5. A lift pipe inlet for a pneumatic catalyst lift, said lift comprising a substantially vertical open-ended lift pipe, extending downwardly into a lift feed tank to a level intermediate the top and bottom of the tank, a primary gas pipe projected upwardly through the bottom of the tank directly beneath the lift pipe, secondary gas introduction means for introducing gas into the mass of contact material in said tank at locations laterally spaced from the lower end of said lift pipe, to push the material inwardly about the lower end of the lift pipe, the improvement which comprises: an inlet for the lower end of said lift pipe, the diameter of the upper end of the inlet being substantially equal to the diameter of the lower end of the lift pipe, the inner surface of the inlet being flared outward gradually from substantially vertical at the top of the inlet following a curve whose initial radius of curvature is about 3–6 times the inside diameter of the lift pipe, the curve continuing smoothly with a radius of curvature of about 0.75–4 inches to the bottom of the inlet, said curved inner surface approximating an hyperbolic spiral curve, a tangent to the curve at the bottom of the inlet being substantially horizontal, the curve continuing from the bottom of the pipe upwardly with a radius of curvature of about 0.5–1 inch, the outer surface of the inlet shaped in the form of a truncated cone, with the lower end of the cone being tangent to the last mentioned curve section.

6. A gas lift for conveying upwardly granular material comprising a substantially vertical elongated lift pipe, a separating vessel at the top of the pipe, a feeding vessel at the bottom of the pipe, means for introducing granular material into the feeding vessel to form a compact column of particles about the bottom of the lift pipe, an upwardly directed pipe terminating near the bottom of the lift pipe adapted to introduce primary lifting gas into the lift pipe, means for introducing lifting gas into the feeding vessel at at least one location outside of the lift pipe and laterally offset from its axis and far enough from its lower end so that it passes through a substantial bed of granular material before entering the lift pipe, the lower end of said lift pipe tapered outwardly from the vertical pipe straightaway along substantially a curve of gradually decreasing radius until it reaches the bottom of the lift, means for withdrawing separated lift gas from the separator and conduit means for withdrawing granular material from the bottom of the separating vessel.

7. A gas lift for conveying upwardly granular material comprising a substantially vertical elongated lift pipe, a separating vessel at the top of the pipe, means defining a material containing zone at the bottom of the pipe, means for introducing granular material into the said zone to form a compact column of particles about the bottom of the lift pipe, an upwardly directed pipe terminating near the bottom of the lift pipe adapted to introduce primary lifting gas into the lift pipe, the lower end of said lift pipe being tapered outwardly from the vertical pipe straightaway along substantially a curve of gradually decreasing radius until it reaches the bottom of the lift, means for introducing secondary gas marginally of said zone in an annular path in radially spaced coaxial relationship to the lift pipe far enough from it so that the secondary gas passes through a substantial bed of granular material before entering the lift pipe, means for withdrawing separated lift gas from the separator and conduit means for withdrawing granular material from the bottom of the separating vessel.

8. The method of lifting granular material that comprises vertically upwardly flowing a lift gas stream, establishing and maintaining a body of solid, compact granular material adjacent the bottom of said stream and pneumatically propelling succeeding quantities of said body of contact material through a path having substantial length and terminating in a curve of progressively increasing radius leading into the margin of said stream.

References Cited in the file of this patent

UNITED STATES PATENTS

| | | |
|---|---|---|
| 2,509,984 | Morrow | May 30, 1950 |
| 2,541,077 | Leffer | Feb. 13, 1951 |
| 2,561,409 | Ardern | July 24, 1951 |
| 2,587,669 | Weinrich | Mar. 4, 1952 |
| 2,602,707 | Garoutte | July 8, 1952 |
| 2,616,521 | Berg | Nov. 4, 1952 |
| 2,668,755 | Kershaw et al. | Feb. 9, 1954 |

FOREIGN PATENTS

| | | |
|---|---|---|
| 82,016 | Switzerland | Oct. 16, 1919 |
| 7,075 | Netherlands | Mar. 18, 1922 |